US012767909B2

(12) United States Patent
Glucina

(10) Patent No.: US 12,767,909 B2
(45) Date of Patent: Oct. 20, 2026

(54) FERMENTATION MONITORING SYSTEM AND METHOD

(71) Applicant: DEFINE INSTRUMENTS LIMITED, Rosedale (NZ)

(72) Inventor: Christian Anthony Glucina, Auckland (NZ)

(73) Assignee: DEFINE INSTRUMENTS LIMITED, Auckland (NZ)

( * ) Notice: Subject to any disclaimer, the term of this patent is extended or adjusted under 35 U.S.C. 154(b) by 236 days.

(21) Appl. No.: 18/394,221

(22) Filed: Dec. 22, 2023

(65) Prior Publication Data

US 2024/0254417 A1 Aug. 1, 2024

Related U.S. Application Data

(63) Continuation-in-part of application No. PCT/NZ2022/050080, filed on Jun. 23, 2022.

(30) Foreign Application Priority Data

Jun. 25, 2021 (NZ) ........................................ 777605

(51) Int. Cl.
*C12C 11/07* (2006.01)

(52) U.S. Cl.
CPC .................................. *C12C 11/075* (2013.01)

(58) Field of Classification Search
CPC ..... C12C 11/075; C12C 11/00; C12C 11/006; C12C 11/003; C12C 13/10; G01F 23/296;
(Continued)

(56) References Cited

U.S. PATENT DOCUMENTS

2018/0072972 A1* 3/2018 Shin ........................ C12C 13/10
2020/0292434 A1* 9/2020 Wells .................. G01N 29/326

FOREIGN PATENT DOCUMENTS

DE 102007047175 * 4/2009 ............ C12C 11/00
DE 102007047175 A1 4/2009
(Continued)

OTHER PUBLICATIONS

International Search Report and Written Opinion dated Aug. 26, 2022, PCT Application No. PCT/NZ2022/050080, 9 pages.
(Continued)

*Primary Examiner* — Eric J Yoon
(74) *Attorney, Agent, or Firm* — MH2 Technology Law Group, LLP

(57) ABSTRACT

The invention relates to a system configured to monitor fermentation activity in a brewing vessel, the vessel comprising a gas internal region and a liquid internal region, in use, and a gasses outlet fluidly connecting the gas internal region to the environment, the system has one or more sensors configured to determine the level of the liquid region of the vessel; a gas flow sensor fluidly connected to the gasses outlet and configured to output a signal indicative of the mass or rate of gas flow though the gasses outlet; a controller configured to determine a change in specific gravity based on: the one or more sensors configured to determine the level of the liquid region of the vessel, the signal from the gas flow sensor, an initial specific gravity measurement; and wherein the controller is further configured to generate an output, display and/or store a fermentation activity signal based on the determined change in specific gravity.

20 Claims, 7 Drawing Sheets

(58) Field of Classification Search
CPC . G01F 23/30; G01F 23/14; G01F 1/76; G01F 1/74; G01F 15/024; G05B 19/042; G05B 19/0428; G01N 9/26; G01N 9/02; G01N 29/02; G01N 9/24; G01N 2291/022; G01N 2291/02818; G05D 23/1928; C12M 1/36
See application file for complete search history.

(56) References Cited

FOREIGN PATENT DOCUMENTS

| | | | |
|---|---|---|---|
| ES | 2811679 | A1 | 3/2021 |
| JP | H0723764 | A | 1/1995 |
| WO | 2022271038 | A1 | 12/2022 |

OTHER PUBLICATIONS

Author Unknown, Tilt Hydrometer and Thermometer, retrieved from internet on Aug. 25, 2022, https://web.archive.org/web/20180401041837/https://tilthydrometer.com/, published Apr. 1, 2018, as per Wayback Machine, 7 pages.

* cited by examiner

FERMENTATION MONITORING SYSTEM AND METHOD

CROSS-REFERENCE TO RELATED APPLICATIONS

This application is a Continuation-in-Part of International Application No. PCT/NZ2022/050080, filed Jun. 23, 2022, pending, and claims priority to New Zealand Patent Application No. 777605, filed Jun. 25, 2021, which are incorporated herein by reference in their entireties.

FIELD OF THE INVENTION

The invention relates to monitoring of gasses produced during fermentation of alcohol, and in particular to a system and method of determining fermentation progress based on carbon dioxide production.

BACKGROUND OF THE INVENTION

A brewer's current solution to fermentation tracking is typically inadequate at best, to completely disorganised, at worst. Most brewers rely on taking specific gravity readings once a day with handheld hydrometers and writing the results down on a piece of paper. When this is done correctly, it suffers from a very low amount of data. This gives an all too broad idea of fermentation progress that does not inform accurately enough to optimise the important processes that rely on fermentation progress. It is also hard for brewers to visualise progress when relying on a sheet of numbers. Breweries are highly dynamic environments, they are noisy, wet and there is always urgent work that needs to be done. This means specific gravity readings are often forgotten about, or untrained cellar/bar staff are expected to take specific gravity reading which leads to incorrect measurements and mislabelled readings. Even if specific gravity readings are taken correctly, it's not uncommon for a leaking hose or an unfortunate collision to destroy the paper on which these readings are recorded.

FIG. 1 shows a brewing fermentation apparatus which is commonly used by small and medium sized beer brewing operations. The conventional apparatus includes a fermentation tank 10, depicted as a conical fermentation tank. During a fermentation process, the tank 10 has a liquid 12 in a first lower portion of the tank which ferments and emits gas 13. The gasses are collected in an upper region of the tank above the liquid. The gas produced during the beer fermentation process is carbon dioxide ($CO_2$). Emitted gasses are vented from the tank 10 by an outlet conduit 14, typically implemented by a tube fluidly connected between the interior of the tank and the atmosphere. To prevent atmospheric gas from entering the interior of the tank (and potentially spoiling or contaminating the fermenting contents), an airlock is connected to the outlet 14. The airlock 15 may be simply implemented by a bucket of water positioned at the exit of the outlet conduit. Other forms of water based airlocks are possible and operate to provide a sanitary interface between the interior of the tank and the atmosphere. $CO_2$ gas produced during fermentation is vented through the outlet 14 and the airlock 15 to the atmosphere.

All fermenting tanks 10 further include a pressure relief valve 16 as a contingency measure in the event the output 14 is blocked.

A specific gravity (SG) sampling process is repeated periodically through fermentation process. The SG measurement is the most important parameter brewers are looking for: From this measurement, they move to different steps in the brewing process such as changing temperatures for diacetyl rest, adding hops, or completing the fermentation process. Brewers monitoring the fermentation process will typically remove a sample of liquid 12 from the tank 10 and measure the SG of the fermenting liquid as a measure of the fermentation progress. Brewers use a range of instruments to measure SG from the sample taken, including basic glass hygrometers, to more sophisticated optical instruments. However there are several problems associated with conventional sampling techniques.

One problem is the SG measurement process is quite onerous, requiring significant time and effort to conduct. As such, the SG measurement is typically taken at most a few times each day.

As the brewing industry, and particularly the craft brewing industry has matured, so too have beer consumers. Increasingly consumers crave consistency in their favourite products. The consumer wants to trust that every time they pick up their favourite craft beer from the shelf, it will taste just as good as the last time they had it. This presents a further problem for brewers, where they may not be able to identify the precise time to make a desired change in the fermentation process. A consistent fermentation process requires a data driven approach that brewers simply do not have—brewers need to know that every time they brew a batch of their best-selling IPA, that fermentation has progressed exactly as it did the previous batch and the hundreds of batches before that. Brewers are starting to realise that as competition in the craft sphere continues to increase coupled with stagnating growth rates, they need to work even harder to keep their repeat customers happy and consuming their highly profitable core offerings.

OBJECT OF THE INVENTION

It is an object of the present invention to provide system, apparatus and method for fermentation monitoring or control that overcomes or at least partially ameliorates some of the abovementioned problems or which at least provides the public with a useful choice.

SUMMARY OF THE INVENTION

In one aspect the invention consists in a system configured to monitor fermentation activity in a brewing vessel, the vessel comprising a gas internal region and a liquid internal region, in use, and a gasses outlet fluidly connecting the gas internal region to the environment, the system comprising:

- a first pressure sensor fluidly connected to the gasses region of the vessel and configured to output a signal indicative of the pressure in the gas internal region,
- a second pressure sensor fluidly connected to the liquid region of the vessel and configured to output a signal indicative of the pressure in the liquid internal region,
- a gas flow sensor fluidly connected to the gasses outlet and configured to output a signal indicative of the gas flow though the gasses outlet;
- a controller configured to determine a change in specific gravity based on:

the signal from the first pressure,
the signal from the second pressure sensor,
the signal from the gas flow sensor,
an initial specific gravity measurement; and wherein the controller is further configured to generate an output, display and/or store a fermentation activity signal based on the determined change in specific gravity.

In a further aspect the invention the invention consists in a system configured to monitor fermentation activity in a brewing vessel, the vessel comprising a gas internal region and a liquid internal region, in use, and a gasses outlet fluidly connecting the gas internal region to the environment, the system comprising:

- a first pressure sensor fluidly connected to the gasses region of the vessel and configured to output a signal indicative of the pressure in the gas internal region, and
- a gas flow sensor fluidly connected to the gasses outlet and configured to output a signal indicative of the mass or rate of gas flow though the gasses outlet;
- a controller configured to generate an output, display and/or store a fermentation activity signal based on a determined change in specific gravity, wherein the controller determines change in specific gravity by assessing
  - the amount of carbon dioxide dissolved in liquid contained in the liquid internal region,
  - the amount of carbon dioxide present in the gas internal region, and
  - the amount of carbon dioxide removed from the brewing vessel through the gasses outlet
- using at least one signal transmitted by the first pressure sensor, and at least one signal transmitted by the gas flow sensor.

In a further aspect the invention the invention consists in computer executable instructions stored on a computer readable medium accessible to a controller for monitoring fermentation activity in a brewing vessel, the computer executable instructions being configured to execute the steps of:

- receiving an initial specific gravity measurement
- receiving at least one signal indicative of the pressure in a gas internal region of the brewing vessel,
- receiving at least one signal indicative of the mass or rate of gas flow through a gasses outlet of the brewing vessel;
- assessing the amount of carbon dioxide dissolved in liquid contained in the liquid internal region using the at least one signal indicative of the pressure in a gas internal region, and the at least one signal indicative of the mass or rate of gas flow through a gasses outlet,
- assessing the amount of carbon dioxide present in the gas internal region using the at least one signal indicative of the pressure in the gas internal region, and
- assessing the amount of carbon dioxide removed from the brewing vessel through the gasses outlet using at least one signal transmitted by the gas flow sensor.
- generating an output, display and/or storing a fermentation activity signal based on a determined change in specific gravity based on the amount of carbon dioxide assessed to be dissolved in liquid contained in the liquid internal region and the amount of carbon dioxide present in the gas internal region and the amount of carbon dioxide removed from the brewing vessel through the gasses outlet.

In some embodiments the system provided in accordance with the invention may also include a second pressure sensor fluidly connected to the liquid region of the vessel and configured to output a signal indicative of the pressure in the liquid internal region. Preferably the signals provided by both the first and second pressure sensors may be used to determine the level or volume of the liquid internal region and/or the volume of the gas internal region.

In some embodiments the system provided in accordance with the invention may also include a temperature sensor configured to output a signal indicative of the temperature of the liquid contained within the liquid internal region.

In some embodiments the controller of the system provided in accordance with the invention may be configured to receive at least one signal indicative of the atmospheric pressure at the location of the brewing vessel. In a range of embodiments this atmospheric pressure indicator may be provided through for example:

- a barometer at the same location as the brewing vessel
- information relating to the brewing vessel's height above sea level,
- an assumption that atmospheric pressure is static at 1 atmosphere, and/or
- through receiving Internet-based transmissions of local atmospheric pressure from a weather information provider.

In various embodiments the controller may be programmed to assess the amount of carbon dioxide present in the gas internal region of the brewing vessel. This assessment may be completed by receiving signals from a variety of sources and using the ideal gas law to solve for a molar mass of carbon dioxide. For example in various embodiments the following expression can be utilised to solve for n, the molar mass of carbon dioxide present in the internal gas region:

$$n = PV/RT$$

where

- P is the sum of the pressure sensed within the internal gas region and the value of the atmospheric pressure at the location of the brewing vessel,
- V is the volume of the internal gas region, preferably determined by assessing the level or volume of liquid in the adjacent liquid internal region and subtracting this from the total known volume of the brewing vessel,
- R is the gas constant, and
- T is the sensed temperature of the liquid present in the liquid internal region.

In such embodiments the invention's ability to account for carbon dioxide present in gas within the brewing vessel increases the accuracy of the information it provides to monitor fermentation activity. Furthermore some fermentation processes call for the addition of hop material while also sealing the gasses outlet to enhance the aroma characteristics of the resulting beer. In such instances the fermentation activity occurring within the brewing vessel can be monitored by assessing the increased pressure of gas phase carbon dioxide building up inside the brewing vessel.

In various embodiments the controller may be programmed to assess the amount of carbon dioxide dissolved in liquid contained in the liquid internal region of the brewing vessel. Preferably this assessment may be undertaken using a piecewise function which considers the maximum or saturation amount of carbon dioxide which can be held by the liquid contained in the liquid internal region under current conditions.

In various preferred embodiments the controller may be programmed to periodically and repeatedly calculate a current saturation value or True$CO_2$ value using the following expression:

$$\text{TrueCO}_2 = \frac{5.16 \times (GP + BP)}{(T + 12.4) \times SG \times \left(1 + \frac{E}{0.789}\right)}$$

Where:

$TrueCO_2$—True Carbonation ($CO_2$) in v/v

GP—Gauge Pressure in psi

BP—Barometric Pressure in psia

T—Temperature in ° F.

SG—Specific Gravity

E—Ethanol in w/w 5.16—Henry's Law Water Constant 0.789—Density of Ethanol

In various embodiments the SG—specific gravity variable referenced in the above expression may be provided by a specific gravity calculation made with the invention immediately prior to the use of this expression. The use of the above expression in the calculation of a current dissolved carbon dioxide saturation value allows this reservoir of dissolved carbon dioxide be monitored in real time using actual measurements.

As indicated above the invention preferably employs a piecewise function which changes its output depending on if the liquid in the brewing vessel is determined to be saturated with dissolved carbon dioxide. For example, unless the liquid is at an early stage in the fermentation process the amount of carbon dioxide dissolved in the liquid contained by the brewing vessel may be deemed to be equal to the saturation value of carbon dioxide which can be held by this liquid based on current measured conditions. The dissolved carbon dioxide present in the liquid may be determined to be at saturation by considering the amount of carbon dioxide present in the gas internal region and the amount of carbon dioxide removed from the brewing vessel. If for example these two values are found to exceed a threshold percentage value of a current saturation value of carbon dioxide which can be held, the liquid can be deemed to be at saturation.

In various preferred forms of such embodiments the liquid contained by the brewing vessel may be deemed to be saturated with carbon dioxide when the amount of carbon dioxide present in the gas internal region and the amount of carbon dioxide removed from the brewing vessel is assessed to exceed 1.0% of the liquid's carbon dioxide saturation value.

In alternative forms of such embodiments the liquid contained by the brewing vessel may be deemed to be saturated with carbon dioxide when the amount of carbon dioxide present in the gas internal region and the amount of carbon dioxide removed from the brewing vessel is assessed to exceed 1.5% of the liquid's carbon dioxide saturation value.

In yet further alternative forms of such embodiments the liquid contained by the brewing vessel may be deemed to be saturated with carbon dioxide when the amount of carbon dioxide present in the gas internal region and the amount of carbon dioxide removed from the brewing vessel is assessed to exceed 2.0% of the liquid's carbon dioxide saturation value.

In various embodiments the amount of carbon dioxide dissolved into the liquid contained by the brewing vessel may be estimated while this liquid is assessed to be holding less than the liquid's carbon dioxide saturation value. Such an estimation may be made by applying or multiplying a scaling factor between 0 and 1 to the liquid's carbon dioxide saturation value. The scaling factor used may be determined empirically by modelling the degree of carbon dioxide saturation experienced by wort in various circumstances or conditions. Such a model may estimate current wort saturation level based on variables—such as for example—

- elapsed time from pitching of yeast or detection of increased pressure in the gas internal region of the brewing vessel
- the temperature or temperature profile over time of the wort within the brewing vessel,
- amount of yeast pitched into the wort at the start of the fermentation process,
- the original gravity of the wort and/or the style of beer being brewed, source grains mashed and brewing adjuncts introduced.

Those skilled in the art will appreciate that empirical models of wort carbon dioxide saturation may be utilised in the early stages of fermentation as a guide to the brewer. However once the wort is deemed to be saturated with carbon dioxide the amount of carbon dioxide present in the fermenting wort can be confidently assessed using measurements for the remainder of the fermentation and brewing process.

In some embodiments, the controller is further configured to display multiple determined specific gravity determination based a fermentation time period.

In some embodiments, the controller is configured to output one or more control actions based on the determined change in specific gravity.

In some embodiments, the control actions comprise any one or more of:

- a fermentation vessel temperature control signal; or
- a hops addition signal.

In some embodiments, the controller is configured to:

- determine the difference between a new determination of a specific gravity time profile to any one or more stored specific gravity time profiles, and
- output a signal operable to control the fermentation process based on the determined difference.

In some embodiments, the controller is configured to:

- determine the difference between a new determination of a specific gravity time profile to any one or more stored specific gravity time profiles, and
- output a signal operable to control the fermentation process when the determined difference meets a threshold.

In some embodiments, the controller is further configured to determine a measure of yeast vitality based on a rate of change of gas flow over a predetermined time period, and output an alert based on a comparison of the rate of change to a predetermined threshold.

In one aspect the invention consists in a method of operating a controller for monitoring fermentation activity in a brewing vessel, the vessel comprising a gas internal region and a liquid internal region, in use, and a gasses outlet fluidly connecting the gas internal region to the environment, the method comprising operating the controller to perform the steps of:

- receiving an initial specific gravity measurement
- receiving a signal indicative of the pressure in the gas internal region,
- receiving a signal indicative of the pressure in the liquid internal region,
- receiving a signal indicative of the gas flow though the gasses outlet; then
- determining a change in specific gravity based on the received signals and the initial specific gravity measurement; and output, display and/or store a fermentation activity signal based on the determined change in specific gravity.

In some embodiments, the controller is further configured to perform the step of displaying multiple determined specific gravity determination based a fermentation time period.

In some embodiments, the controller is further configured to perform the step of outputting one or more control actions based on the determined specific gravity.

In some embodiments, the control actions comprise any one or more of:

outputting a fermentation vessel temperature control signal; or outputting a hops addition signal.

In some embodiments, the controller is configured to:

determine the difference between a new determination of a specific gravity time profile to any one or more stored specific gravity time profiles, and output a signal operable to control the fermentation process based on the determined difference.

In some embodiments, the controller is further configured to perform the steps of:

determining the difference between a new determination of a specific gravity time profile to any one or more stored specific gravity time profiles, and outputting a signal operable to control the fermentation process when the determined difference meets a threshold.

In some embodiments, the controller is further configured to perform the steps of determining a measure of yeast vitality based on a rate of change of gas flow over a predetermined time period, and outputting an alert based on a comparison of the rate of change to a predetermined threshold.

In some embodiments, the controller is further configured to determine a measure of yeast vitality based on a rate of change of gas flow over a predetermined time period, and output an alert based on a comparison of the rate of change to a predetermined threshold.

In some embodiments, the controller is further configured to determine a measure of yeast vitality by the steps of: determining a mass flow rate has exceeded a threshold mass flow rate for a predetermined period of time.

In some embodiments, the controller is further configured to optimise the brewing vessel for dry hop introduction by the steps of:

determining a target time for dry hop introduction based on the $CO_2$ mass flow;

determining or receiving a target temperature of the vessel at the target time; and outputting a signal operable to control a cooling system to cool the vessel to the target temperature by the desired time based on a determination of the thermal mass of the vessel from the first and second pressure sensors.

In another broad aspect the invention consists in a system configured to monitor fermentation activity in a brewing vessel, the vessel comprising a gas internal region and a liquid internal region, in use, and a gasses outlet fluidly connecting the gas internal region to the environment, the system comprising:

one or more sensors configured to determine the level of the liquid region of the vessel;

a gas flow sensor fluidly connected to the gasses outlet and configured to output a signal indicative of the mass or rate of gas flow though the gasses outlet;

a controller configured to determine a change in specific gravity based on:

the one or more sensors configured to determine the level of the liquid region of the vessel, the signal from the gas flow sensor, an initial specific gravity measurement; and wherein the controller is further configured to generate an output, display and/or store a fermentation activity signal based on the determined change in specific gravity.

In some embodiments, the one or more sensors configured to determine the level of the liquid region of the vessel comprises:

a first pressure sensor fluidly connected to the gasses region of the vessel and configured to output a signal indicative of the pressure in the gas internal region, and a second pressure sensor fluidly connected to the liquid region of the vessel and configured to output a signal indicative of the pressure in the liquid internal region.

For example, in various embodiments the level or volume of liquid present in the liquid region of the vessel may be calculated using the following expression:

$$\text{Liquid level} = K \times (\text{Liquid pressure value} - \text{gasses region pressure value})$$

Where

Liquid pressure value is provided by the second pressure sensor,

Gasses region pressure value is provided by the second pressure sensor, and

K is a constant based on the geometry of the brewing vessel.

In another broad aspect the invention consists in a method of operating a controller for monitoring fermentation activity in a brewing vessel, the vessel comprising a gas internal region and a liquid internal region, in use, and a gasses outlet fluidly connecting the gas internal region to the environment, the method comprising operating the controller to perform the steps of:

receiving an initial specific gravity measurement, receiving one or more signals indicative of the level of the liquid region of the vessel, receiving a signal indicative of the gas flow though the gasses outlet; then determining a change in specific gravity based on the received signals and the initial specific gravity measurement; and output, display and/or store a fermentation activity signal based on the determined change in specific gravity.

In a further broad aspect the invention consists in a method of operating a controller for monitoring fermentation activity in a brewing vessel, the vessel comprising a gas internal region and a liquid internal region, in use, and a gasses outlet fluidly connecting the gas internal region to the environment, the method comprising operating the controller to perform the steps of:

receiving an initial specific gravity measurement receiving at least one signal indicative of the pressure in a gas internal region of the brewing vessel, receiving at least one signal indicative of the mass or rate of gas flow through a gasses outlet of the brewing vessel;

assessing the amount of carbon dioxide dissolved in liquid contained in the liquid internal region using the at least one signal indicative of the pressure in a gas internal region, and the at least one signal indicative of the mass or rate of gas flow through a gasses outlet, assessing the amount of carbon dioxide present in the gas internal region using the at least one signal indicative of the pressure in the gas internal region, and assessing the amount of carbon dioxide removed from the brewing vessel through the gasses outlet using at least one signal transmitted by the gas flow sensor.

generating an output, display and/or storing a fermentation activity signal based on a determined change in specific gravity based on the amount of carbon dioxide assessed to be dissolved in liquid contained in the liquid internal region and the amount of carbon dioxide present in the gas internal region and the amount of carbon dioxide removed from the brewing vessel through the gasses outlet.

In some embodiments, receiving a signal indicative of the level of the liquid region of the vessel comprises: receiving a signal indicative of the pressure in the gas internal region, and receiving a signal indicative of the pressure in the liquid internal region.

Other aspects of the invention may become apparent from the following description which is given by way of example only and with reference to the accompanying drawings.

In this specification where reference has been made to patent specifications, other external documents, or other sources of information, this is generally for the purpose of providing a context for discussing the features of the invention. Unless specifically stated otherwise, a reference to such external documents is not to be construed as an admission that such documents, or such sources of information, in any jurisdiction, are prior art, or form part of the common general knowledge in the art. It is also to be understood that the specific devices illustrated in the attached drawings and described in the following description are simply exemplary embodiments of the invention. Hence, specific dimensions and other physical characteristics related to the embodiments disclosed herein are not to be considered as limiting.

It is acknowledged that the term "comprise" may, under varying jurisdictions, be attributed with either an exclusive or an inclusive meaning. For the purpose of this specification, and unless otherwise noted, the term 'comprise' shall have an inclusive meaning, allowing for inclusion of not only the listed components or elements, but also other non-specified components or elements. The terms 'comprises' or 'comprised' or 'comprising' have a similar meaning when used in relation to the system or to one or more steps in a method or process.

As used hereinbefore and hereinafter, the term "and/or" means "and" or "or", or both.

As used hereinbefore and hereinafter, "(s)" following a noun means the plural and/or singular forms of the noun.

When used in the claims and unless stated otherwise, the word 'for' is to be interpreted to mean only 'suitable for', and not for example, specifically 'adapted' or 'configured' for the purpose that is stated.

For the purposes of this specification, the term "plastic" shall be construed to mean a general term for a wide range of synthetic or semisynthetic polymerization products, and generally consisting of a hydrocarbon-based polymer.

For the purpose of this specification, where method steps are described in sequence, the sequence does not necessarily mean that the steps are to be chronologically ordered in that sequence, unless there is no other logical manner of interpreting the sequence.

Reference to the terms "Flow rate" and "Total Flow" are intended to be interpreted as follows:

Flow Rate is the flow per unit time. Typical units are L/min or Gallons/min

Total Flow is the accumulated volume at any point in time of the flow. Typical units are L or Gallons. Total flow is typically calculated by integrating the flow rate over time.

The entire disclosures of all applications, patents and publications, cited above and below, if any, are hereby incorporated by reference.

BRIEF DESCRIPTION OF THE DRAWINGS

Preferred embodiments of the invention will be described by way of example only and with reference to the drawings, in which.

DETAILED DESCRIPTION

In this specification there are described exemplary embodiments of a system, method and apparatus relating to fermentation monitoring. Particular aspects of the described embodiments enable a near real-time determination of the $CO_2$ production which occurs during fermentation, and a near real-time determination of the specific gravity. In some embodiments, the $CO_2$ determination is used to generate alerts which the brewer may be responsive to. In other embodiments, the $CO_2$ determination is used to enable one or more control actions. The particular embodiments do not require the removal of a liquid sample from the fermentation vessel.

In further embodiments, there is an electronic system operable to record brewer notes during the fermentation process, alongside the SG measurements. In some embodiments, the notes are matched with a particular $CO_2$ determination and a particular time.

Historical fermentation data allows brewers to compare fermentations data from historical batches, and to forecast expected fermentation profiles. The comparison of historical and new fermentation profiles enables the fermentation of each batch to be as consistent as possible. For example, the evolution of new fermentation data can be compared to historical fermentation data, and where any deviation is identified, environmental corrections are able to be made by manual input from the brewer, or by predetermined control action. Accordingly, embodiments discussed here are directed toward revolutionising the approach to brewing by collecting both fermentation data and brewers own sensory data. In some embodiments, the system includes a cloud based system configured to store data, by a thereby providing brewers with comprehensive historical fermentation data. Local based storage solutions are equally applicable.

Figure 1:
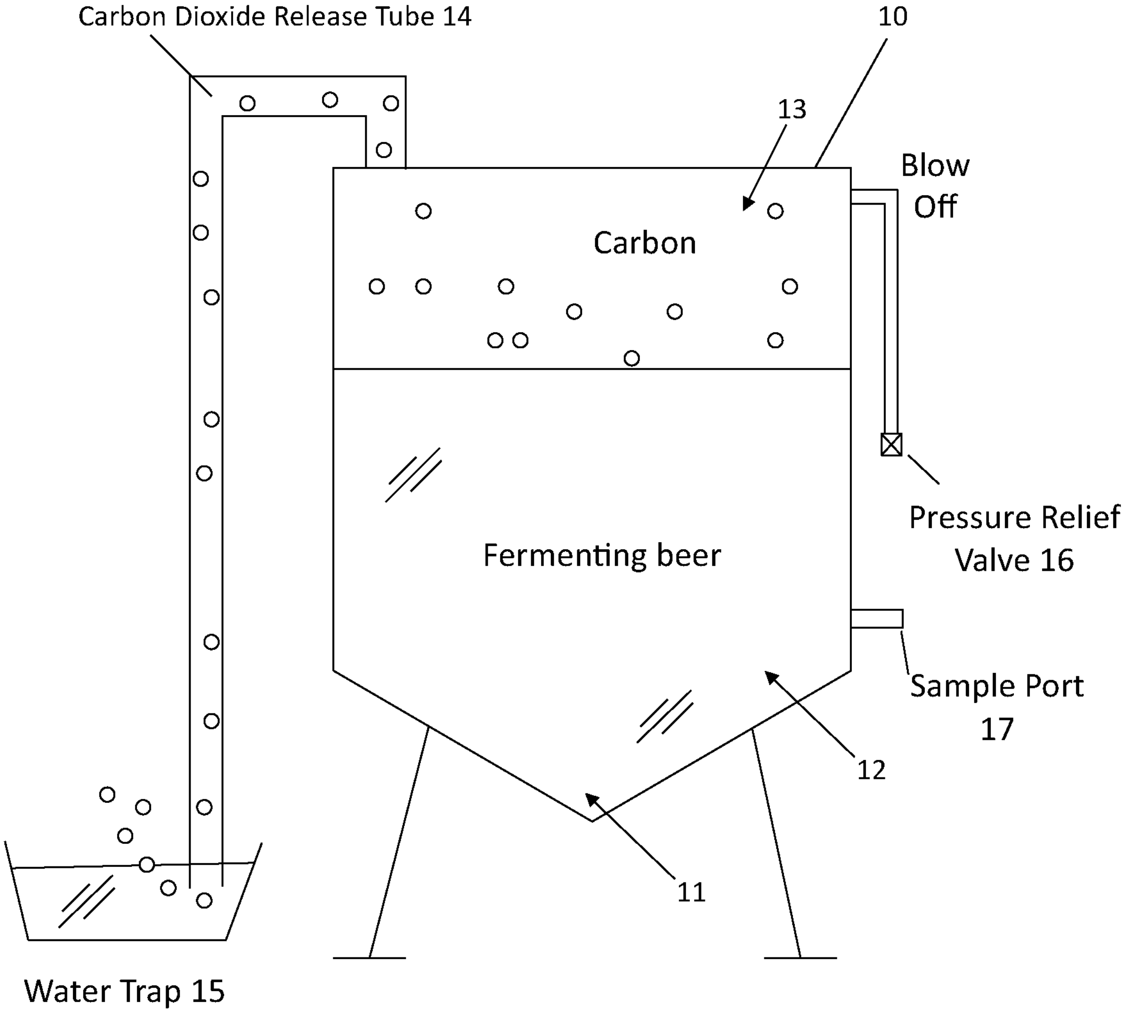
Fig. 1 (PRIOR ART)
FIG. 1 shows a brewing fermentation apparatus which is commonly used by small and medium sized beer brewing operations.
Figure 2A:
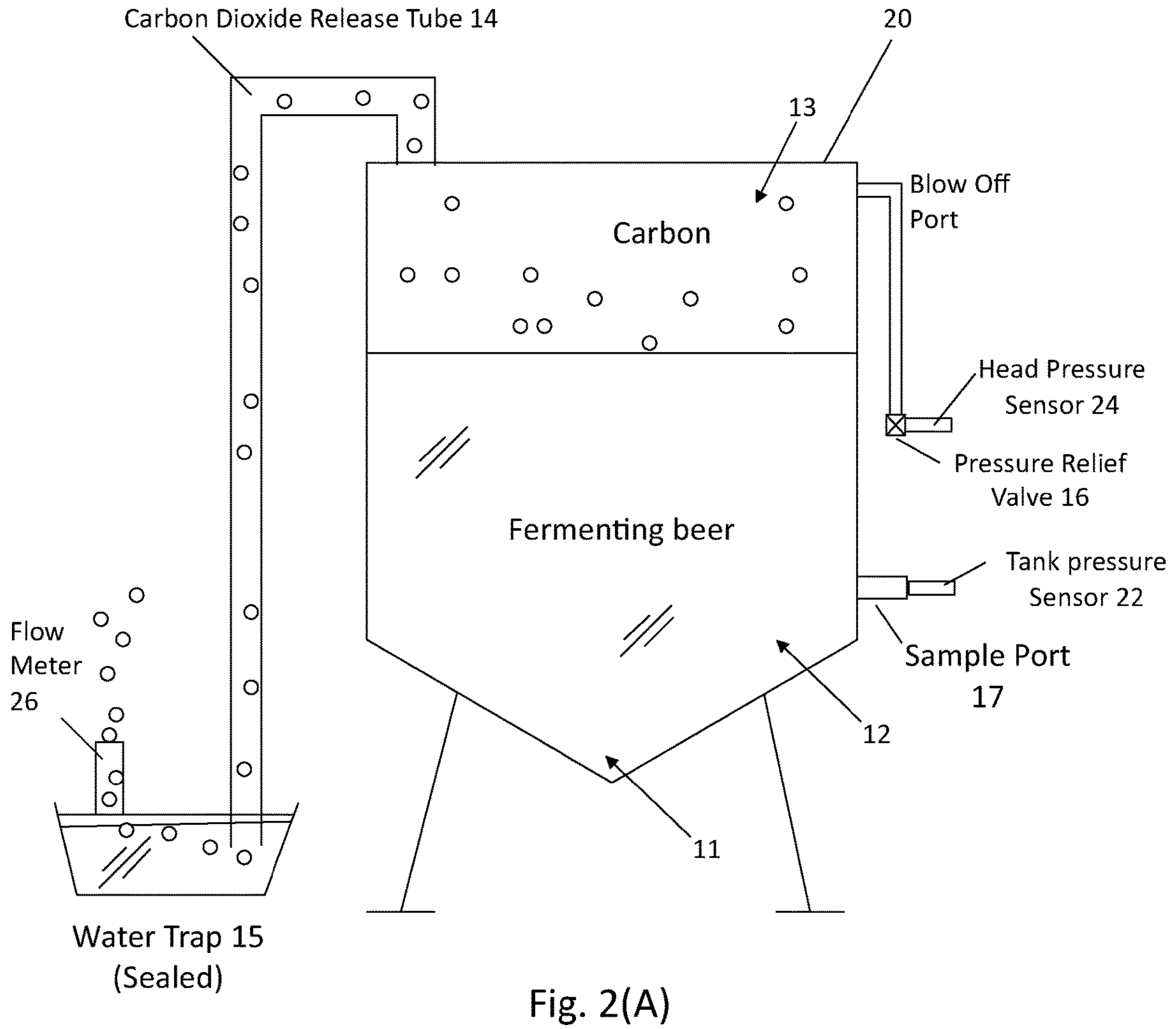
FIG. 2A provides a schematic diagram which shows a set of electronic components configured for use with a fermentation tank.

FIG. 2A shows a schematic diagram which shows a set of electronic components configured for use with a fermentation tank. In particular, the electronic components include a first liquid pressure sensor 22 configured to fluidly connect with the region of the fermentation tank 20 which contains the fermenting liquid. Accordingly, the liquid pressure sensor 22 is fluidly connected to the lower region of the tank. In some embodiments, the first liquid pressure sensor 22 is fluidly connected to the sampling conduit which most fermentation tanks will already have. The first liquid pressure sensor 22 is configured to output a signal voltage proportional to the pressure of the lower, liquid region of the tank 20.

The electronic components further include a second head pressure sensor 24 which is fluidly connected the region of the fermentation tank 20 which contains fermenting gasses. One particularly advantageous location of the head pressure sensor 24 is to be located in the pressure release conduit 16, since this conduit is typically fluidly connected with the very top of a fermentation tank 20 and therefore not likely to be submerged. The head pressure sensor 24 is configured to output a signal voltage proportional to the pressure of the upper, gas region of the tank 20.

The electronic components further include a gas flow sensor 26 which is fluidly connected with the gas vent tube 14 which allows fermentation gasses to escape from the tank 20 to the atmosphere. The flow sensor 26 is ideally positioned after the water trap so that the trap will capture any potential contaminants contained with the gas before they are able to enter the sensor.

It should be noted that the exemplary embodiments described in this specification are described with reference to the flow sensor 26 and pressure sensors 22, 24. The flow sensor provides a flow rate L/Min. "Mass Flow" is the technology of the preferred kind of sensor technology. Other types of gas sensors may be used to determine a gas flow signal or equivalent sensor configured to determine the gas flow rate and therefore the mass of the gas flow through the sensor. For example, a venturi based sensor, paddle wheel, time of flight and other sensor types are possible for determining mass from a gas flow.

It should also be noted in exemplary embodiments, that the pressure sensors are primarily used to determine the level of the wort so the brew master does not have to enter this value. Other types of level sensors may also be used to provide an equivalent signal to the first and second pressure sensors. For example, an ultrasonic sensor could be configured to measuring the liquid level from the top of the tank. Floatation based sensors may also be used to determine the liquid level.

In some embodiments, the function of water trap for protecting the sensor from debris is supplemented by an additional filtration device to improve the sensor immunity to contaminants and debris. Such supplemental devices may be desired by brewers who experience a "blowout" where yeast foam and hop debris can travel down the vessels blow off arm and into the water trap, quickly overflowing it and damaging the sensor. A blow out can occur when fermentation is either significantly more vigorous than expected, or the headspace of the vessel is insufficient. In some embodiments, the mass flow sensor enclosure includes a 0.5 micron inline filter and a fluid stop valve, such as provided by a vertical tube and biased ball dam device placed in between the sensor and water trap. Tests have shown the supplemental filtration device protects the sensor from both minor blowouts and to act as a failsafe in the event of a catastrophic blowout. This merely prevents the sensor from being clogged with debris. The gas mass flow sensor is configured to output a signal voltage proportional to the quantity of gas flow exhausted from the tank 20. Various gas flow sensor types for measuring the flow rate or total quantity of the exhausting gas can be used, as mentioned.

Figure 2B:
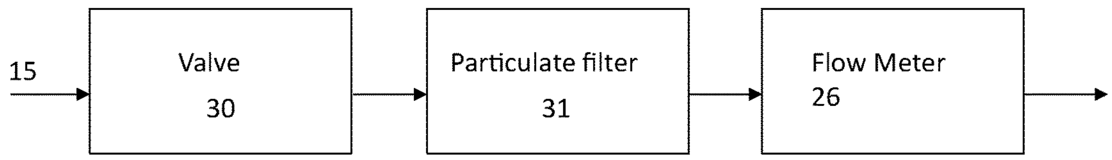
FIG. 2B shows a schematic diagram of a series of a fluid stop valve, particulate filter and mass flow sensor.

FIG. 2B shows a schematic view of this arrangement of components, including the mass flow sensor 26, with an upstream particulate filter 31, and an upstream fluid stop valve 30.

The fluid stop valve may be implemented by a device such as a chamber containing a ball. The chamber has an entry for gas and fluid to a chamber body interior. Gas passes around the ball in the valve, to an outlet at the chamber upper region. Fluid entering the chamber body causes the valve to float to the top of the chamber body and block the chamber outlet. Other devices which function to pass gasses yet substantially stop fluids from passing are equally applicable.

The first liquid pressure sensor 22, the second head pressure sensor 24, and the gas flow sensor 26 connected to a controller module which is configured to receive the sensor control voltages, determine, the representative pressures and gas mass flow, and calculate an amount of sugars from the fermenting liquid which have been converted into $CO_2$. This calculation allows for a determination of the change in SG which has occurred in the fermenting liquid.

In particular, the upper and lower pressure sensors are configured to allow an accurate level of the liquid within tank. The level information is then combined with the total CO2 mass measured to thereby determine the change in SG over the duration of a fermentation process.

Alcoholic Beer fermentation is a biotechnological process accomplished mainly by yeast to convert sugars into ethyl alcohol and carbon dioxide. The basic chemical formula for fermentation is:

Formula 1

$$C_6H_{12}O_6 \longrightarrow 2\,C_2H_5OH + 2\,CO_2$$

Where: $C_6H_{12}O_6$ is glucose; $C_2H_5OH$ is ethanol (alcohol); and $CO_2$ is carbon dioxide.

When fermentation happens in a typical craft brewing application, the $CO_2$ waste product is vented to atmosphere via a hygienic trap. By measuring the $CO_2$ being vented out to the atmosphere information can be obtained about the fermentation process. The rate of $CO_2$ production is directly proportional to the rate of fermentation. This is a very useful metric for a brew master to have access to. For example, if a brew master compared fermentation rates of past batches with a current batch information on relative yeast health. If the $CO_2$ flow rate is integrated over time, a graph of $CO_2$ generated can be viewed.

As beer starts to ferment, the SG reduces. For example, a beer might start out with a SG of 1.064, and when the fermentation process has finished, have a SG 1.013. Embodiments discussed are operable to calculate the change to SG based on changes to the mass of the fermentation liquid, and changes to the volume of the fermentation liquid. Formula 1 indicates sugar is converted to ethanol (the wanted product) and to $CO_2$ the waste product. As $CO_2$ is exhausted to the environment we can deduce that mass has left the system by the weight of the $CO_2$ itself.

The change in volume can also be deduced from Formula 1. From Formula 1, calculation of the density change is determined by assuming the removal of the $CO_2$. What remains is:

Formula 2

$$C_6H_{12}O_6 \longrightarrow 2\ C_2H_5OH$$

On the left side of the equation, the glucose molecule has a density of 1.56 g/ml. On the right-hand side ethanol has a density of 0.784 g/ml @ 25 C. As one molecule of glucose is converted into two of ethanol, the overall density changes from 1.56 to 2*0.784(1.568) representing practically no change.

This can be summarised by the volume of liquid changing an insubstantial amount during the fermentation process, however the density is going to be reduced by the mass of $CO_2$ is exhausted to atmosphere.

The change in SG can be estimated from information including the volume of the beer mixture (wort) before fermentation starts, and the amount of $CO_2$ exhausted:

Formula 3

Change in SG = (Initial Mass of beer wort - Mass of $CO_2$ lost in fermentation)

Where: Initial Mass of Beer wort in Kgs assuming S.G=1.0; and $CO_2$ lost in fermentation in Kgs For example, if there is 1000 kg of initial beer wort and the mass of exhausted $CO_2$ is measured to be 9.5 kg; the change SG=0.9905.

To convert the change to SG the initial SG of the wort is required. The initial SG measurement would have to be done with another SG measurement device like a hydrometer, and is typical practice to perform this measurement on every brew.

Formula 4

Current SG = Initial SG* change in SG

The mass of the initial wort contained in the fermentation tank 20 can be measured by using the upper and lower pressure sensors. The wort mass is calculated by:

Formula 5

Mass of wort = (tank pressure sensor 22-Head pressure sensor 24)* Calibration factor + dead space volume.

The calibration factor in Formula 5 changes the readings from the pressure sensors to display in kg which is a factor of the geometry of the tank and the units of the pressure sensors. The dead space volume variable is the volume in litres (or kg) of the volume below the upper pressure sensor at the tank port. The dead space volume variable is the volume in litres (or kg) of the volume below the tank pressure sensor 22 at the tank port. This dead space is not measured by the sensor.

The output of a mass flow meter is given typically in a rate L/min, or gallons/hour at a standard temperature and pressure. Most flow sensors would typically normalise the readings to a standard temperature of 25 degrees C. and at standard atmospheric pressure.

By integrating the gas flow rate over time, a determination of the total CO2 exhausted through the fermentation process can be calculated.

The total $CO_2$ value is converted into kg by using the density constant for $CO_2$ at 25 degrees C. and one atmosphere, which is 1.836 kg/m3. In some embodiments, this value is refined by an environmental pressure sensor configured to measure atmospheric pressure and relay that information to the controller for compensation. The compensation is determined by multiplying the $CO_2$ gas flow rate by the atmospheric pressure which has been calibrated in atmospheres.

Figure 5:
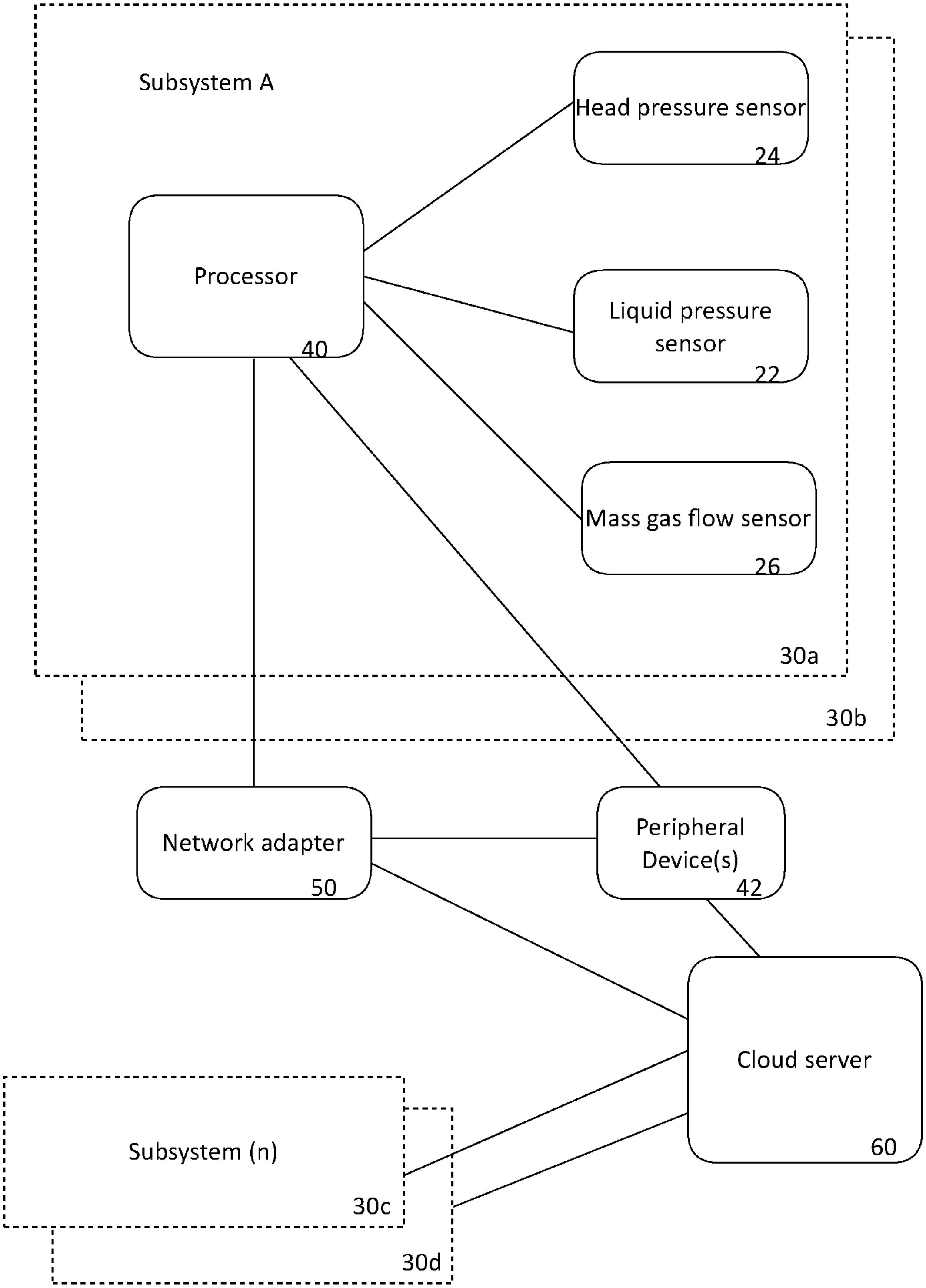
FIG. 5 shows a schematic diagram of exemplary system comprising components configured to facilitate fermentation monitoring.

FIG. 5 shows a schematic diagram of exemplary system 100 comprising components configured to facilitate fermentation monitoring. Each of the first head pressure sensor 24, the liquid (wort) pressure sensor 22, and the gas flow sensor 26 are operably connected to a controller module 40. The controller module 40 is configured to receive voltages representing the magnitudes of the sensed parameter, and interpret those voltages according to look-up tables or models to thereby interpret the value of the sensed parameter.

In various embodiments the controller module is implemented as modules of analogue hardware, digital hardware, processors, volatile data storage media, non-volatile data storage media and any combination of these known to the reader as suitable for given applications. The controller module may also be implemented in software for execution by various types of processors. An identified module of executable code may, for instance, comprise one or more physical or logical blocks of computer instructions which may, for instance, be organised as an object, procedure, or function. Further, the controller module need not be physically located in a single location, but may comprise disparate parts in different locations which, when joined logically together, comprise the controller module and achieve the stated purpose for the module. In various embodiments, operations such as calculation, generation, elimination or other logical or mathematical operations are implemented using any computing or processor operations known to the reader as suitable for given applications.

Program code executed by the controller module 40 for carrying out operations for aspects of the present disclosure may be written in any combination of one or more programming languages. The program code may execute entirely on a microprocessor, user computer, partly on a user computer, as a stand-alone software package, partly on a microprocessor, user computer and partly on a remote computer or entirely on the remote computer or server. In the latter scenario, a remote computer may be connected to a local computer through any type of network, including a local area network (LAN) or a wide area network (WAN), or the connection may be made to an external computer, for example, through the Internet using an Internet Service Provider. Further, the term network is generally used to describe a means through which data is transported from one location or module to another. In this context, the network may equally include the transportation of data by writing that data to a transportable form of computer readable storage media, and relocating that storage from one physical location to another.

In the exemplary embodiment depicted by FIG. 5, the sensors 22, 24, 26 and controller 40 form a subsystem (A) 30. In a brewery, there may be several fermentation tanks, and as such, a subsystem of sensors and controller fitted to each tank. In this case, subsystem 30*a* and 30*b* represent fermentation tanks in a first location. In another location, other subsystems (n) 30*c*, 30*d* may be located. The locations may be another area of one brewery, two separate breweries, or any combination. In other exemplary embodiments, one controller module may be connected to many sets of sensors. For example, a controller module implemented by a microprocessor which may in many cases be equipped with several sensor input pins, therefore enabling direct connection between that microprocessor and many sensors according to available pins. In other embodiments, sensor sets may be digitized by discrete ADC converters, and the digitized data transmitted to a controller module by network, multiplexer or data bus.

In some embodiments, where two or more subsystems are to be connected, one solution is to provide a computing node 60 to interconnect subsystems 30. In some embodiments, the computing node is as a cloud computing node. In some embodiments, the cloud computing node is a computer server system which is operational with numerous other general purpose or special purpose computing system environments or configurations. Examples of well-known computing systems, environments, and/or configurations that may be suitable for use with computer system/server include, but are not limited to, personal computer systems, server computer systems, client computing devices, handheld or laptop devices, multiprocessor systems, microprocessor-based systems, programmable consumer electronics, network PCs, minicomputer systems, mainframe computer systems, and distributed cloud computing environments that include any of the above systems or devices, and the like. The computing node 60 is not intended to suggest any limitation as to the scope of use or functionality of embodiments of the invention described herein. Further, the computing node is capable of being implemented and/or performing any of the functionality of the controller 40 as set forth hereinabove.

The computing node 60 may be described in the general context of cloud computing system operable to execute instructions, such as program modules. Generally, program modules may include routines, programs, objects, components, logic, data structures, and so on that perform particular tasks or implement particular abstract data types. The computing node 60 may be practiced in distributed cloud computing environments where tasks are performed by remote processing devices that are linked through a communications network. In a distributed cloud computing environment, program modules may be located in both local and remote computer system storage media including memory storage devices.

In preferred embodiments, the computing node 60 is a general-purpose computing device. Components of the computing device may include, but are not limited to, one or more processors or processing units, a system memory, and a data communications bus that couples various system components including system memory to processor. The data communications bus represents one or more of any of several types of bus structures, including a memory bus or memory controller, a peripheral bus, an accelerated graphics port, and a processor or local bus using any of a variety of bus architectures.

The computing node 60 typically includes a variety of computer system readable media. Such media may be any available media that is accessible by computer including both volatile and non-volatile media, removable and non-removable media. System memory can include computer system readable media in the form of volatile memory, such as random access memory (RAM) and/or cache memory. The computing node 60 may further include other removable/non-removable, volatile/non-volatile computer system storage media. By way of example only, a storage system is provided for reading from and writing to a non-removable, non-volatile drive media. In such instances, each can be connected to the data bus by one or more data interfaces. Memory may include at least one program product having program modules that are configured to carry out the functions of embodiments of the invention. Programs for execution by computing devices may be stored in memory, as well as an operating system, one or more application programs, other programs, and program data. Each of the operating system, one or more application programs, other program modules, and program data or some combination thereof, may include an implementation of a networking environment. Programs generally carry out the functions and/or methodologies of embodiments.

Communication can occur via Input/Output (I/O) interfaces or via one or more networks 50 such as a local area network (LAN), a general wide area network (WAN), and/or a public network such as the Internet via a network adapter. As depicted, network 50 communicates with the other components. In some embodiments, one or more external peripheral devices 42 is connected to the computing node 60, and/or controller 40, either directly, or via the network 50. The peripheral devices 42 include devices such as a keyboard, a pointing device, a display and other like devices and may be connected to the controller of any one or more subsystem, and/or the computing node 60. In some embodiments, the computing node 60 comprises a display for data received from the controller module 40. In some embodiments, the controller 40 is configured to interface with the sensors, and transmit the sensor data to the computing node 60 for further processing.

It will be appreciated that the system 100 is equally applicable for fermentation monitoring of one fermentation tank, multiple fermentation tanks, and where multiple fermentation tanks are located in multiple locations. As such, the system 100 offers monitoring of many fermentation tanks from a central location. Further, that location may be anywhere. For example, the computing node may be enabled by any appropriate computing device and a connection to the network.

In some embodiments, access the computing node 60 is provided by a user gateway. Any one or more users may be controlled by way of a user permission criteria. For example, the computing may require a user permission status determined by at least fee payment. Further, fermentation monitoring services may be provided by way of SAAS.

Herein described are processing functions implemented with reference to a controller. The functions of the controller may be implemented by the controller module 40 and/or the computing node 60, or any such processing device or a similar nature.

Other sensors and devices are optionally implemented, such as one or more temperature sensors configured to provide vessel temperature data. The controller may further be configured to operate a vessel temperature control system based on the temperature data provided by the one or more temperature sensors. Further, in some embodiments, temperature control decisions are based on the SG determination.

Figure 3:
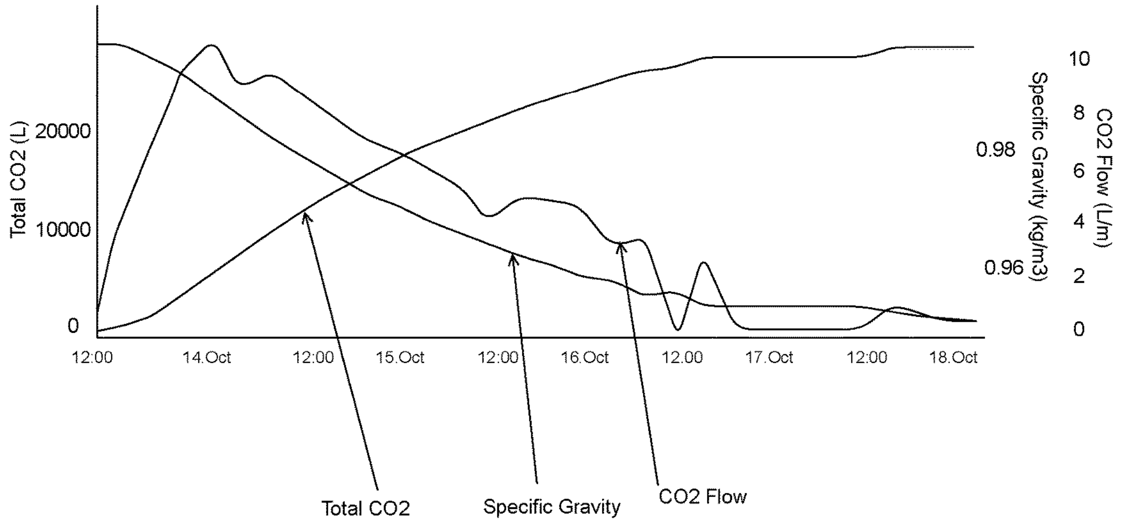
FIG. 3 shows a graph of data measured during a five day duration of a fermentation process.

FIG. 3 shows a graph of data measured during a five day duration of a fermentation process. The graph includes a $CO_2$ flow rate measurement, a total $CO_2$ mass (integrated from the flow rate over time) and a change in SG deduced from the change in $CO_2$. The $CO_2$ flow rate measurement is determined by the controller. The controller is configured to integrate the $CO_2$ flow rate measurement over time and thereby determine the total $CO_2$ mass over the integration period. The controller is further configured to determine a change of SG by calculation of Formulae 1-5 and based on an initial SG value. The initial SG may be a predetermined reference or default value, a calculated value, or a measured value. In some embodiments, the controller is configured to receive an input representing an initial SG of the wort. The input may be received from a brewer entering data on a peripheral device from a measurement they have made, or from a measurement device adapted to measure the wort.

The data of FIG. 3 represents a typical fermentation process where: the $CO_2$ flow rate will climb to a peak value over a period of about one day, before gradually falling over the remaining fermentation period as yeast is consumed by the sugars of the wort. As $CO_2$ is produced, the change in SG is determined and observable in near real-time, since signal from the sensors, and the associated calculations, can typically be performed in a small number of controller clock cycles.

Figure 4:
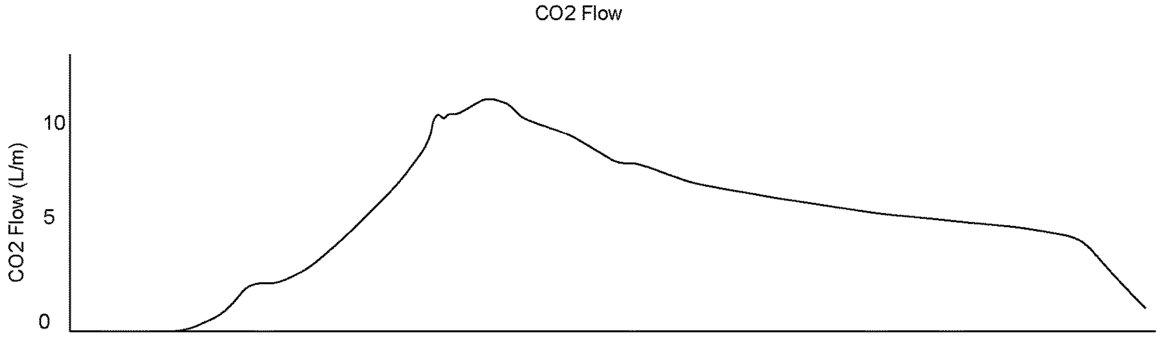
FIG. 4 shows a graph of exemplary $CO_2$ flow rate which a brewers may monitor to see exactly how their fermentation is progressing.

FIG. 4 shows a graph of exemplary $CO_2$ mass flow data which a brewers may monitor to see exactly how their fermentation is progressing. The $CO_2$ flow rate is an exact measure of fermentation rate and can be converted to a real-time SG reading. One of the key metrics for measuring beer production is specific gravity (SG), this tells the brewer the relative density of beer as it ferments. This information is critical because it allows the brewer to estimate the level of alcohol currently in the beer and it lets them know how their fermentation is tracking over time. This insight into how fermentation is progressing informs the brewer when certain actions need to be performed.

In some embodiments, the controller is configured to generate an alert based on a $CO_2$ mass flow threshold. In some embodiments, the controller is configured to execute a further action based on $CO_2$ mass flow threshold being reached. In some embodiments, the action may be any one or more of executing a diacetyl rest process, a hops addition process such as dry hopping, or other actions which may be part of a brewing process.

Diacetyl rest: Vicinal diketones (VDK) are a byproduct of fermentation, If VDK is left in a beer it transforms into diacetyl, an undesirable flavor compound that is best described as microwaved butter popcorn, strong artificial butter taste that leaves your mouth feeling slick. Understandably brewers want to avoid this at any cost, luckily for brewers, yeast will break down VDK for use as metabolic energy as fermentation progresses but the rate at which yeast does this is determined by the yeast's temperature. This poses a problem for brewers as, at the temperatures most beers are brewed at is kept relatively low to prevent other undesirable flavour compounds from being produced, but at these temperatures it would take the yeast an inordinate amount of time to fully process all VDK produced. The solution is to raise the temperature of the fermentation after fermentation has reached its peak, this minimizes negative impact from the temperature increase and allows VDK to be processed by the yeast over a short 'diacetyl rest' of only a few days.

Dry Hopping: As craft beer popularity has exploded over the last few years so too has popularity of hop heavy beers, to achieve these high levels of hop flavor and aroma brewers must 'Dry Hop' their beers, this entails submerging hop pellets or cones directly into beer to extract heat sensitive, volatile hop oils which give beers their signature hoppinness. The timing of a dry hop is crucial as brewers need to complete a careful balancing act to minimise contact time with the beer (extended contact can lead to grassy/vegetal flavours), higher contact temperature (to extract more total oils), hop while fermentation is still active (to achieve yeast biotransformation of hop compounds) but not hop too early in fermentation (to minimize loss of aroma compounds to expelled CO2).

Diacetyl rest and dry hopping are each a particularly crucial process to implement, and timing critical. Brewers are effectively enabled to target the correct timing to optimise these processes from the SG information as a fermentation is progressing.

Other controller actions may include a change to the temperature of the fermentation vessel. For example, in some embodiments, the controller is further configured to control the temperature of the fermentation vessel by being configured to receive one or more signals representing vessel temperature (such as a signal from one or more temperature probes), and output a signal operable to adjust a temperature controller, or power to a heater element, or similar to thereby control the vessel temperature.

In some embodiments, the controller is configured to implement the diacetyl rest action by determining a threshold CO2 total flow (L) or flow rate (L/min) threshold is reached, then controlling the temperature of the vessel accordingly.

In some embodiments, the controller is configured to store one or more $CO_2$ total flow (L) or flow rate (L/min) thresholds based on historical fermentation data. For example, the historical thresholds could represent stages of the fermentation process which requires one or more of intervention from the brewer, or automation of one or more actions.

For example, in some embodiments, the controller is configured to implement a dry hop temperature correction action by determining a threshold CO2 total flow (L) or flow rate (L/min) threshold is reached, then controlling the temperature of the vessel to a brewers specification, ensuring the vessel is a the correct temperature for dry hopping at a set time.

It is often desirable to add hops during the fermentation process, typically known as dry hopping. To improve dry hopping results, it is preferably that the hops is added at a particular time during the fermentation process, and further, that the hops is added when the wort is at a particular desired temperature which is lower than the previous fermentation temperature.

Accordingly, in some embodiments, the controller is configured to control the temperature of a vessel such that a desired wort temperature is reached at a particular time during the fermentation process. To do this, the controller is configured to determine the rate of change of wort temperature which can be achieved. This rate of change will be largely based on the capacity of a cooling system configured to cool the vessel, and potentially environmental temperature. Further, the thermal mass of the wort must also be known. In some embodiments, the controller is configured to determine the thermal mass of the wort from the pressure sensors. In some embodiments, the controller is configured to determine the cooling capacity of the vessel cooling system based on measuring the rate of change of temperature for a particular electrical power output to the cooling system. Based on these variables, the controller is configured to determine a time over which the vessel can be cooled to a target temperature suitable for dry hop introduction to the vessel.

A brewer may specify a target time for dry hop introduction during the fermentation process, or the controller may be configured to determine the dry hop introduction time based on the fermentation progress. Fermentation process can be determined by the controller by determination of a CO2 flow rate or mass flow threshold being reached.

Therefore, an optimised system for dry hop introduction during fermentation is when the controller is configured to:

determine a target time during fermentation based on the CO2 total flow (L) or flow rate (L/min);

determine or receive a target temperature of the wort/vessel at the target time; and output a signal operable to control a cooling system to cool the wort to the target temperature by the desired time.

In some embodiments, the controller is configured to store time based SG information thereby representing a fermentation profile for a brew that has taken place—such as that illustrated by FIG. 4. The fermentation profile is viewable by the brewer and this makes for ready identification of any anomalies which might have occurred during the fermentation process.

In some embodiments, the controller is configured to compare any one or more historical fermentation profiles which have been stored to a new fermentation process which is underway. A brewer is able to readily identify any difference between current fermentation activity and historic fermentation activity. This allows fermentation control changes to be made (such as a change in vessel temperature) by the brewer if a problem is identified. Alternatively, the controller is configured to output a signal operable to make fermentation control changes based on a determined difference, and in some embodiments, when the determined difference meets a threshold.

The above described embodiments are related to determination of a change in SG relative to a determined initial specific gravity. However, in other embodiments, the controller is configured to base any one or more of the above described outputs on a relative change in SG.

Those skilled in the art will recognise that many other actions are possible based on the real-time SG determination.

Yeast Vitality

In some exemplary embodiments, the controller is configured to determine a measure of yeast vitality and an output alert and/or control actions based on the measure. Yeast vitality is linked to the rate of fermentation which occurs, where fresh or high vitality yeast typically produces a faster rate of fermentation that aged or low vitality yeast. A single batch of yeast is often used over several fermentation processes. However, the vitality of the yeast can have an impact on the final taste of the beer. Therefore, a brewer is typically in control of when the yeast should be replaced or refreshed. For example, a brew may replace or refresh the yeast after a predetermined number of fermentation processes, or based on fermentation speed.

In some embodiments, the controller is configured to determine the rate of $CO_2$ production based on a measurements of the total flow (L) or flow rate (L/min) over time from mass flow sensor 26. FIG. 4 illustrates a graph of gas flow measured by the sensor 26 and in particular, an exemplary rate of change 55 of the flow data can be determined over time. Typically, the first one to two days of fermentation are most indicative of yeast vitality. The controller is further configured to output an indication of yeast vitality based on the determined rate. A brewer presented with this data, is able to take action such as replacing or refreshing the yeast. In some embodiments, the controller is further be configured to output an alert if the rate data falls below a time based threshold.

“Lag Time” is a brewing term that refers to the period of time between when yeast is introduced (pitched) into wort, and when active fermentation begins (CO2 production). The correlation between lag time and fermentation health has been established to be a key metric in determining yeast viability. The yeast vitality is an indication to a brewer that the yeast may require replacing or replenishing.

As yeast is usually pitched shortly after a vessel is filled, to prevent unwanted bacteria gaining a foothold in vessel. Through the use of the pressure sensors recording fill time and the mass flow sensor recording the start of active fermentation, the system relays an approximation of this lag time to the brewer.

Accordingly, in some embodiments, the controller is configured to determine a measure of yeast vitality by determining a flow rate or gas flow total has exceeded a threshold mass flow rate for a predetermined period of time; these conditions being met indicative of the lag time as a measure of yeast vitality.

Figure 6:
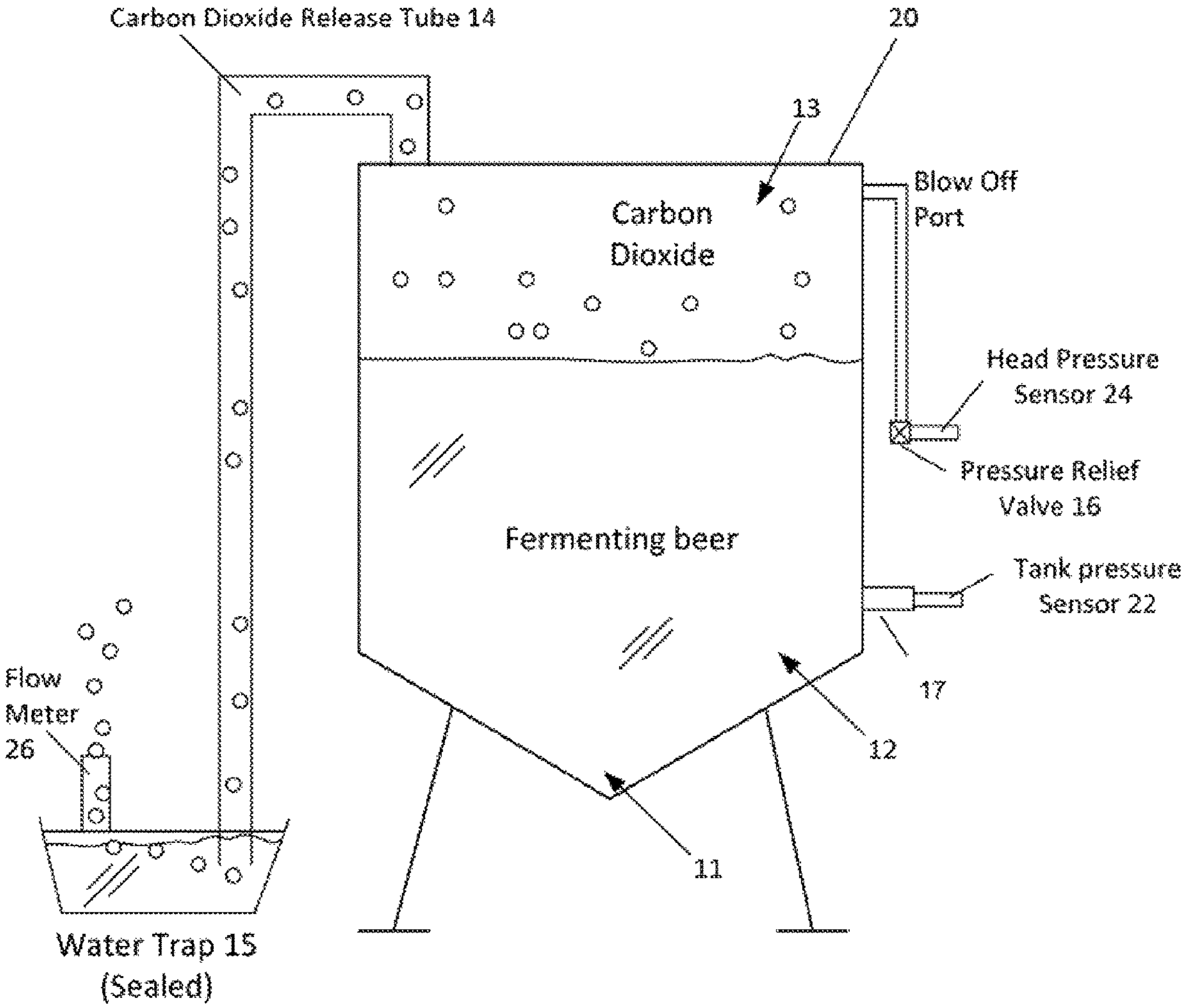
FIG. 6 shows a schematic diagram of electronic components configured for use with a fermentation tank in accordance with a further embodiment.
Figure 7:
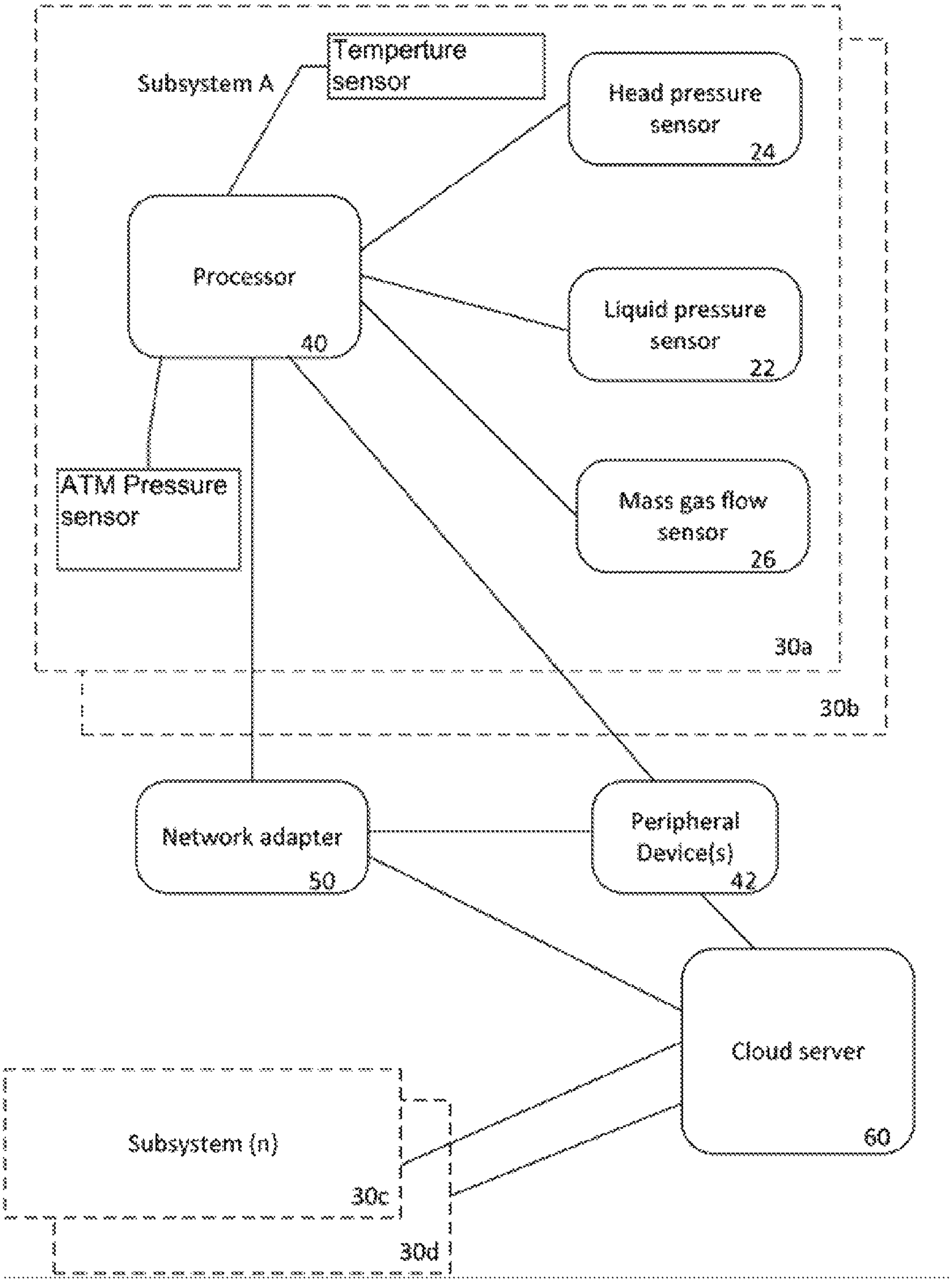
FIG. 7 shows a schematic diagram of exemplary system comprising components configured to facilitate fermentation monitoring in the embodiment illustrated with respect to FIG. 6.

FIG. 6 provides a schematic diagram which shows a set of electronic components configured for use with a fermentation tank in accordance with a further embodiment. FIG. 7 also shows a schematic diagram of an exemplary system comprising components configured to facilitate fermentation monitoring in the embodiment illustrated with respect to FIG. 6. These figures represent the use of essentially the same components as those illustrated in the alternative embodiment shown in FIG. 2*a* and FIG. 5. However in the embodiment shown with respect to FIG. 6 a combined liquid temperature sensor and sampling port 17 is provided which also engages with tank pressure sensor 22. This liquid temperature sensor 17 is arranged to provide a regular output signal indicative of the temperature of wort fermenting inside the brewing vessel formed by fermentation tank 20.

Similarly FIG. 7 illustrates how processor 40 also receives input signals from the temperature sensor shown with respect to FIG. 6 in addition to an atmospheric pressure sensor. In the embodiment shown the atmospheric pressure sensor is provided at the same location as the fermentation tank and provides the processor real-time atmospheric pressure information.

Figure 8:
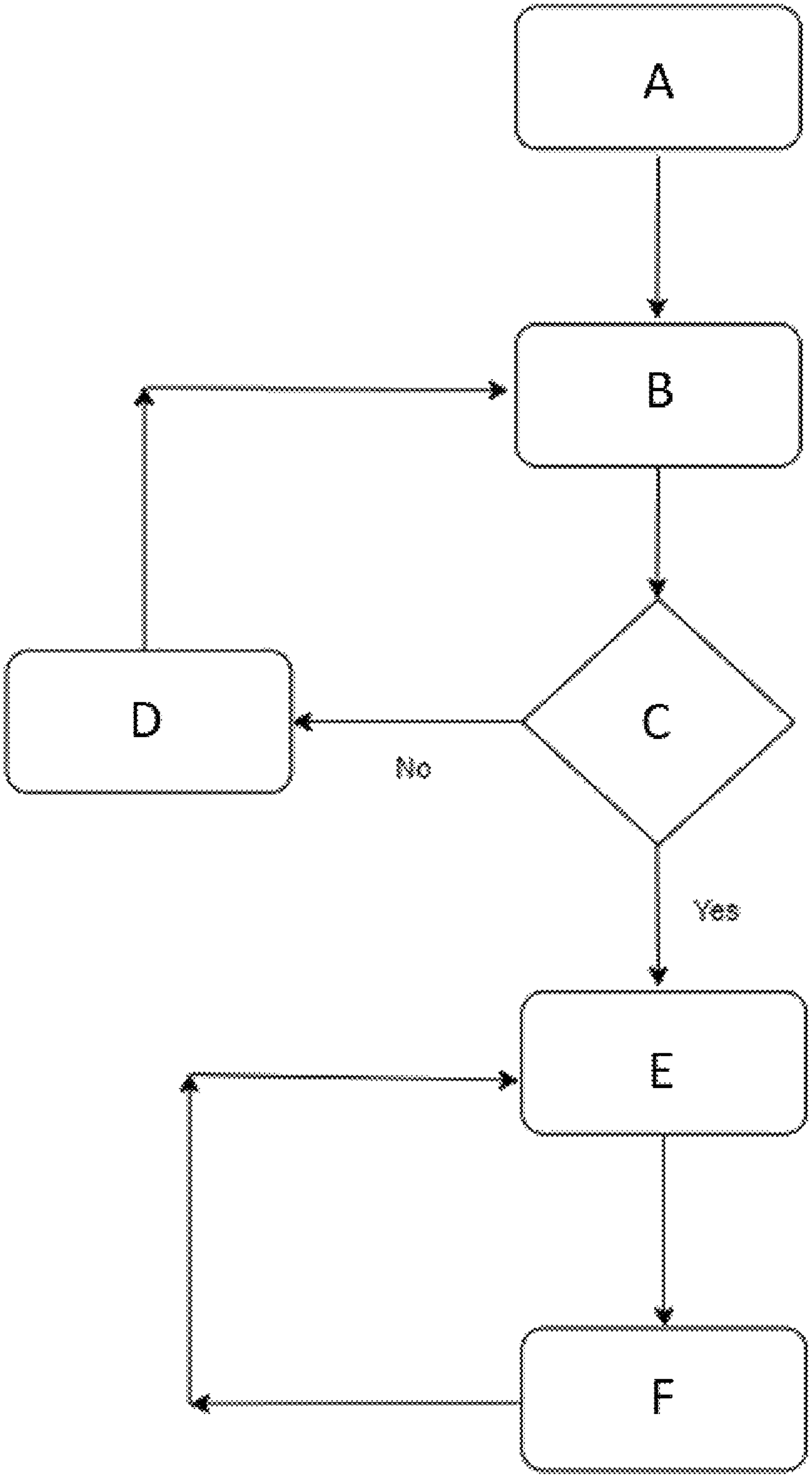
FIG. 8 shows a flow chart illustrating computer executable instructions run by the processor controller shown with respect to FIG. 7.

FIG. 8 shows a flow chart illustrating computer executable instructions run by the processor controller shown with respect to FIG. 7.

The process shown in this embodiment starts with initial step A where the processor receives starting or original gravity measurement information provided manually by a brewer. At this stage a determination is made of the level or volume of liquid contained within the brewing vessel through considering the vessel geometry, a received gas internal region pressure signal and a liquid internal region pressure signal. This information is used at this step to derive a volume value for the gas internal region.

Next at step B the processor receives a series of signals and measurements used in the subsequent steps of this process. Ambient atmospheric pressure information, brewing vessel liquid temperature readings, gas internal region pressure measurements and gas flow rate through the brewing vessel gas outlet measurements are received and stored at this step. At this time the saturation value for dissolved carbon dioxide is also calculated for current brewing vessel liquid and gas conditions—this calculation using the received ambient atmospheric pressure information, brewing vessel liquid temperature readings, and gas internal region pressure measurements.

At step C the controller determines if the liquid contained within the brewing vessel has reached a saturation point with dissolved carbon dioxide. This determination is made through a comparison of the value of the maximum amount of carbon dioxide which can currently be dissolved in the liquid—the saturation value—with the sum of an assessment of the amount of carbon dioxide present in the gas internal region and the amount of carbon dioxide which has been exhausted from the brewing vessel's gas outlet. In the embodiment illustrated if the summed exhausted and contained gas phase carbon dioxide is greater than approximately 1.5% of the current saturation value for dissolved carbon dioxide, the liquid contained within the brewing vessel is determined to have reached saturation with dissolved carbon dioxide.

Step D is executed if the brewing vessel liquid is determined not to have reached saturation with dissolved carbon dioxide. At this step an output specific gravity value is displayed to a brewer using a combination of the sum of the determinations made for exhausted carbon dioxide, gas carbon dioxide in the gas region of the brewing vessel and the saturation value of dissolved carbon dioxide for the brewing vessel liquid multiplied by a scaling value. This scaling value ranges between zero and one to reflect the partial saturation only of the liquid with carbon dioxide. In the embodiment shown the scaling value used is determined experimentally based on the volume of the liquid, temperature the liquid, amount of yeast pitched into the liquid at the start of fermentation, and gas flow rate currently being exhausted from the brewing vessel. In the embodiment shown a lookup table is used to retrieve the required scaling value using the above variables. Once the output specific gravity value determined is displayed the process shown loops back to repeat step B as referenced above.

Step E is executed when the brewing vessel liquid is determined to be saturated with dissolved carbon dioxide. At this step an output specific gravity value is displayed to a brewer using a combination of the sum of the determinations made for exhausted carbon dioxide, gas carbon dioxide in the gas region of the brewing vessel and the saturation value of dissolved carbon dioxide which can be held in the liquid contained in the brewing vessel under current conditions.

The remaining step F is then executed to replicate a similar process to that of step B. At this step the controller receives updated ambient atmospheric pressure information, brewing vessel liquid temperature readings, gas internal region pressure measurements, and measurements of gas flow rate through the brewing vessel gas outlet. At this stage fresh or updated determinations are made for the values of exhausted carbon dioxide and gas carbon dioxide present in the gas region of the brewing vessel. At this time the saturation value for dissolved carbon dioxide is also recalculated to take into account any recent changes in atmospheric pressure, the temperature of the liquid and pressure of the gas contained within the brewing vessel. Once these assessments have been updated using current information the process executed loops to return to execute step E again.

Those skilled in the art will recognise that many other actions are possible based on the real-time yeast vitality determination.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

The invention claimed is:

1. A system configured to monitor fermentation activity in a brewing vessel, the brewing vessel comprising a gas internal region and a liquid internal region that are in use, and a gasses outlet fluidly connecting the gas internal region to an environment, the system comprising:

a first pressure sensor fluidly connected to the gas internal region of the brewing vessel and configured to output a signal indicative of the pressure in the gas internal region, and a gas flow sensor fluidly connected to the gasses outlet and configured to output a signal indicative of the mass or rate of gas flow though the gasses outlet;

a controller configured to generate an output, display and/or store a fermentation activity signal based on a determined change in specific gravity, wherein the controller determines the change in specific gravity by assessing:

the amount of carbon dioxide dissolved in liquid contained in the liquid internal region, the amount of carbon dioxide present in the gas internal region, and the amount of carbon dioxide removed from the brewing vessel through the gasses outlet, wherein the assessing uses at least one signal transmitted by the first pressure sensor and at least one signal transmitted by the gas flow sensor, and wherein the controller is further configured to output one or more control actions based on the determined change in specific gravity, the one or more control actions comprising one or more of:

adding a substance to the brewing vessel, and adjusting an environmental condition within the brewing vessel.

2. The system of claim 1, further comprising a second pressure sensor fluidly connected to the liquid internal region of the brewing vessel and configured to output a signal indicative of the pressure in the liquid internal region.

3. The system of claim 1, further comprising a temperature sensor configured to output a signal indicative of the temperature of the liquid contained within the liquid internal region.

4. The system of claim 1, wherein the controller is configured to receive at least one signal indicative of the atmospheric pressure at the location of the brewing vessel.

5. The system of claim 1, wherein the controller is further configured to display multiple specific gravity determinations based a fermentation time period.

6. The system of claim 1, wherein the one or more control actions comprise any one or more of:

adjusting a fermentation vessel temperature; or adding hops to the brewing vessel.

7. The system of claim 1, wherein the controller is further configured to determine a measure of yeast vitality based on a rate of change of gas flow over a predetermined time period, and output an alert based on a comparison of the rate of change to a predetermined threshold.

8. The system of claim 1, wherein the controller is further configured to determine a measure of yeast vitality by determining whether a flow rate has exceeded a threshold mass flow rate for a predetermined period of time.

9. A non-transitory computer readable medium comprising computer executable instructions accessible to a controller for monitoring fermentation activity in a brewing vessel, the computer executable instructions being configured to execute the steps of:

receiving an initial specific gravity measurement, receiving at least one signal indicative of the pressure in a gas internal region of the brewing vessel, receiving at least one signal indicative of the mass or rate of gas flow through a gasses outlet of the brewing vessel;

assessing the amount of carbon dioxide dissolved in liquid contained in a liquid internal region of the brewing vessel using the at least one signal indicative of the pressure in the gas internal region, and the at least one signal indicative of the mass or rate of gas flow through the gasses outlet, assessing the amount of carbon dioxide present in the gas internal region using the at least one signal indicative of the pressure in the gas internal region, assessing the amount of carbon dioxide removed from the brewing vessel through the gasses outlet using at least one signal transmitted by a gas flow sensor, generating an output, display and/or storing a fermentation activity signal based on a determined change in specific gravity wherein the determined change in specific gravity is based on the amount of carbon dioxide assessed to be dissolved in the liquid contained in the liquid internal region, the amount of carbon dioxide present in the gas internal region and the amount of carbon dioxide removed from the brewing vessel through the gasses outlet, and outputting one or more control actions based on the determined change in specific gravity, the one or more or more control actions comprising one or more of:

adding a substance to the brewing vessel, and adjusting an environmental condition within the brewing vessel.

10. The non-transitory computer readable medium of claim 9, wherein the assessment of the amount of carbon dioxide present in the gas internal region of the brewing vessel uses the expression:

$$n = PV/RT$$

where n is the molar amount of carbon dioxide present in the gas internal region, P is the sum of the pressure sensed within the gas internal region and the value of the atmospheric pressure at the location of the brewing vessel, V is the volume of the gas internal region, R is the gas constant, and T is the sensed temperature of the liquid present in the liquid internal region.

11. The non-transitory computer readable medium of claim 9, wherein the assessment of the amount of carbon dioxide dissolved in the liquid contained in the liquid internal region of the brewing vessel determines if the liquid contains a saturation value of carbon dioxide which can currently be held by the liquid.

12. The non-transitory computer readable medium of claim 11, wherein the liquid contained by the brewing vessel is assessed to be saturated with carbon dioxide when the amount of carbon dioxide present in the gas internal region and the amount of carbon dioxide removed from the brewing vessel is assessed to exceed 1.5% of the liquid's carbon dioxide saturation value.

13. A method of operating a controller for monitoring fermentation activity in a brewing vessel, the brewing vessel comprising a gas internal region and a liquid internal region that are in use, and a gasses outlet fluidly connecting the gas internal region to an environment, the method comprising operating the controller to perform the steps of:

receiving an initial specific gravity measurement, receiving at least one signal indicative of the pressure in the gas internal region of the brewing vessel, receiving at least one signal indicative of the mass or rate of gas flow through the gasses outlet of the brewing vessel;

assessing the amount of carbon dioxide dissolved in liquid contained in the liquid internal region using the at least one signal indicative of the pressure in the gas internal region, and the at least one signal indicative of the mass or rate of gas flow through the gasses outlet, assessing the amount of carbon dioxide present in the gas internal region using the at least one signal indicative of the pressure in the gas internal region, assessing the amount of carbon dioxide removed from the brewing vessel through the gasses outlet using at least one signal transmitted by a gas flow sensor, generating an output, display and/or storing a fermentation activity signal based on a determined change in specific gravity, wherein the determined change in specific gravity is based on the amount of carbon dioxide assessed to be dissolved in the liquid contained in the liquid internal region, the amount of carbon dioxide present in the gas internal region and the amount of carbon dioxide removed from the brewing vessel through the gasses outlet, and outputting one or more control actions based on the determined change in specific gravity, the one or more or more control actions comprising one or more of:

adding a substance to the brewing vessel, and adjusting an environmental condition within the brewing vessel.

14. The method of claim 13, wherein the assessment of the amount of carbon dioxide present in the gas internal region of the brewing vessel uses the expression:

$$n = PV/RT$$

where n is the molar amount of carbon dioxide present in the gas internal region, P is the sum of the pressure sensed within the gas internal region and the value of the atmospheric pressure at the location of the brewing vessel, V is the volume of the gas internal region, R is the gas constant, and T is the sensed temperature of the liquid present in the liquid internal region.

15. The method of claim 13, wherein the assessment of the amount of carbon dioxide dissolved in the liquid contained in the liquid internal region of the brewing vessel determines if the liquid contains a saturation value of carbon dioxide which can be held by the liquid.

16. The method of claim 15, wherein the liquid contained by the brewing vessel is assessed to be saturated with carbon dioxide when the amount of carbon dioxide present in the gas internal region and the amount of carbon dioxide removed from the brewing vessel is assessed to exceed 1.5% of the liquid's carbon dioxide saturation value.

17. The method of claim 13, wherein the controller is further configured to perform the step of displaying multiple specific gravity determinations based a fermentation time period.

18. The method of claim 13, wherein the control actions comprise any one or more of:

adjusting a fermentation vessel temperature; or adding hops to the brewing vessel.

19. The method of claim 13, wherein the controller is further configured to perform the steps of determining a measure of yeast vitality based on a rate of change of gas flow over a predetermined time period, and outputting an alert based on a comparison of the rate of change to a predetermined threshold.

20. The method of claim 13, further comprising operating the controller to optimise the brewing vessel for dry hop introduction by the steps of:

determining a target time for dry hop introduction based on a CO2 mass flow;

determining or receiving a target temperature of the brewing vessel at the target time; and outputting a signal operable to control a cooling system to cool the brewing vessel to the target temperature by a desired time based on a determination of the thermal mass of the brewing vessel from first and second pressure sensors.

* * * * *